United States Patent

Nasr

(10) Patent No.: US 8,311,581 B2
(45) Date of Patent: Nov. 13, 2012

(54) APPARATUS AND METHOD FOR DISABLING RF SIGNAL TRANSMISSIONS FROM WIRELESS NETWORK MODEMS

(75) Inventor: Amr Khaled Nasr, Calgary (CA)

(73) Assignee: GEOTrac International Inc., Calgary, Alberta (CA)

( * ) Notice: Subject to any disclaimer, the term of this patent is extended or adjusted under 35 U.S.C. 154(b) by 331 days.

(21) Appl. No.: 12/820,163

(22) Filed: Jun. 22, 2010

(65) Prior Publication Data

US 2010/0255879 A1 Oct. 7, 2010

Related U.S. Application Data

(62) Division of application No. 11/859,376, filed on Sep. 21, 2007, now Pat. No. 7,813,763.

(30) Foreign Application Priority Data

Sep. 22, 2006 (CA) .................................. 2560755
May 10, 2007 (CA) .................................. 2588173

(51) Int. Cl.
 *H04B 1/38* (2006.01)
(52) U.S. Cl. ...................... 455/557; 455/418; 455/550.1; 340/539.13; 342/357.22
(58) Field of Classification Search .................. 455/557, 455/418, 550.1; 340/539.13; 342/357.22
See application file for complete search history.

(56) References Cited

U.S. PATENT DOCUMENTS

| 6,337,621 | B1 * | 1/2002 | Ogino et al. ............... 340/425.5 |
| 6,683,867 | B1 * | 1/2004 | DeWulf ....................... 370/350 |
| 7,176,833 | B2 * | 2/2007 | Jendbro et al. ........... 342/357.64 |
| 7,323,970 | B1 | 1/2008 | Murray et al. |
| 7,505,784 | B2 * | 3/2009 | Barbera ......................... 455/557 |
| 7,558,564 | B2 * | 7/2009 | Wesby ........................... 455/419 |
| 2004/0075539 | A1 | 4/2004 | Savoie et al. |
| 2004/0077347 | A1 | 4/2004 | Lauber et al. |
| 2006/0035670 | A1 * | 2/2006 | Souissi et al. ................. 455/557 |
| 2006/0109109 | A1 * | 5/2006 | Rajapakse et al. ........ 340/539.13 |
| 2006/0232465 | A1 * | 10/2006 | Levin et al. ............... 342/357.06 |
| 2006/0265195 | A1 | 11/2006 | Woodard et al. |
| 2007/0005224 | A1 | 1/2007 | Sutardja |
| 2007/0018802 | A1 | 1/2007 | Chen et al. |

OTHER PUBLICATIONS

Dickes, Raymond, "Explosives Safety: Safety Strategies for Operating Electroexplosive Devices in a Radio-Frequency Environment", presented at SPE International Conference on Health, Safety and Environment in Oil and Gas Exploration and Production, Mar. 20-22, 2002, Kuala Lumpur, Malaysia, 3 pp., Society of Petroleum Engineers Inc.

* cited by examiner

*Primary Examiner* — Danh Le
(74) *Attorney, Agent, or Firm* — The Webb Law Firm

(57) ABSTRACT

An apparatus and method is provided for disabling radio frequency signal transmissions from a wireless communications network modem when in proximity to sites where explosive devices are being detonated. The apparatus includes an input switch to signal a command to the modem to disable the transmitter portion of the modem or to tune the transmitter to a null gateway on the wireless communications network. By disabling transmissions from the modem, accidental detonation of explosive devices is prevented. When the modem is moved a safe distance away from the explosive devices, the transmitter is re-enabled automatically.

26 Claims, 5 Drawing Sheets

APPARATUS AND METHOD FOR DISABLING RF SIGNAL TRANSMISSIONS FROM WIRELESS NETWORK MODEMS

CROSS-REFERENCE TO RELATED APPLICATION

This application is a division of co-pending U.S. patent application Ser. No. 11/859,376 filed Sep. 21, 2007, which is incorporated herein in its entirety.

FIELD OF THE INVENTION

The field of the present invention relates to an apparatus and method for disabling radio frequency ("RF") signal transmissions from wireless network modems. Specifically, the present invention is related to disabling RF signal transmissions from global positioning system ("GPS") modems when in proximity to it and gas wells where down-hole perforation devices are being detonated.

BACKGROUND

When drilling oil or gas wells, a well may pass through one or more formations that contain oil or gas deposits. When the well is cased in, the formations are then sealed in and can only be accessed if the well casing is perforated to allow substances within the formation to be withdrawn. To perforate a well casing, a perforation device containing explosives is placed down the well to a location adjacent to the formation. The device is detonated resulting in a perforation in the well casing to allow access to the substances. It is known that devices that emit RF signals, such as radios, pagers, cellular phones, GPS modems and the like can accidentally cause the perforation device to detonate prematurely. This can damage the well casing and impair the ability to withdraw substances from down-hole formations as the well casing will not be perforated at the correct location. This is also a safety concern as perforation devices may be prematurely detonated prior to being inserted into the well causing a significant hazard to personnel in proximity to the performance operations. Electronic devices that emit RF signals are also a hazard in the mining especially where explosives are used in blasting operations to collect ore.

In respect of vehicles equipped with GPS modems, some currently available units have the ability to manually disable the modem so as to terminate RF transmissions but this feature usually results in the total shutdown of the modem. Fleet vehicles equipped with GPS modems are often configured to monitor operational parameters of the vehicle that are transmitted to the fleet headquarters using the GPS modem as a method of tracking the vehicle and its usage. This information can include when the vehicle is operating, the location of the vehicle, when the vehicle exceeds posted speed limits among other operational parameters pertinent to the control and management of the fleet vehicle. The known manual shutdown function usually shuts down the ability of the GPS modem to monitor these operational parameters thereby negating the ability to monitor and record vehicle parameters when the modem is disabled.

It is, therefore, desirable to provide an apparatus and method to manually disable RF signal transmissions from a GPS modem that still allows the GPS modem to collect vehicle operational parameters that can be transmitted once the GPS modem is re-enabled after travelling a safe distance from the perforation operations.

SUMMARY

An apparatus and method for disabling RF signal transmissions from a GPS modem is provided.

For the purposes of this specification, the term "GPS modem" shall include wireless GPS communications devices comprising both RF signal transmitters and receivers integrated into the modem. The term "GPS modem" shall also include stand-alone RF signal transmitting devices that are used in conjunction with GPS receiver-only devices to form a functional GPS modem. These transmitting devices can include transmitters for use with satellite communications networks and terrestrial communications networks such as global systems for mobile communications ("GSM") networks. These transmitting devices may incorporate any form of data communication transmission technology such as code division multiple access ("CDMA") transmitters or time division multiple access ("TDMA") transmitters as representative examples as well as many others known to those skilled in the art.

In one embodiment, an apparatus is provided comprising an input command means for generating a modem transmit disable command signal. The input command means is connected to a first circuit means for conveying the transmit disable command signal to a GPS modem via a first connection means. A second connection means is provided for connecting the first circuit means to the GPS modem via a digital input/output port disposed on the GPS modem. In a further embodiment, the input command means comprise an electrical switch, such as a push button switch, that can close or open an electrical circuit that can cause a transition from a low voltage to a high voltage or vice versa. This can represent a transition from a logic "zero" to a logic "one" or vice versa. In another embodiment, the switch can be a momentary single-pole, single-throw switch or equivalent as well known to those skilled in the art. In other embodiments, the input command means can comprise a visual indicator disposed therein to visually indicate when the GPS modem is disabled. In one embodiment, the visual indicator is a light emitting diode connected to the GPS modem through the second connection means, a second circuit means disposed on a circuit board comprising the first circuit means and the first connection means. In another embodiment, both first and second connection means are multi-conductor cables. When a GPS modem is disabled from transmitting RF signals, the visual indicator is turned on to alert a user that the GPS modem is so disabled. When the GPS modem is moved beyond a pre-determined distance from the location where it was disabled, the GPS modem will then re-enable RF signal transmissions and turn off the visual indicator.

The method of disabling RF transmissions from the GPS modem comprises the following steps. A user operates the input command means to generate a modem transmit disable command signal that is conveyed to the first circuit means by the first connection means. The first circuit means conveys the modem transmit disable command signal to the input/output port of the GPS modem by the second connection means. The GPS modem is configured to disable RF signal transmissions upon receiving the modem transmit disable command signal. In one embodiment, RF signal transmissions is disabled by disabling the RF transmitter portion of the GPS modem. This can be accomplished by disconnecting power to the transmitter, muting the transmit oscillator of the RF transmitter or any other way that would be known to a person skilled in the art to disable the RF transmitter portion of the GPS modem. In another embodiment, the RF transmitter is tuned to a non-existent or null gateway on a satellite communications network thereby effectively muting RF signal transmissions from the GPS modem.

In another embodiment, a visual indicator is provided when the GPS modem is disabled from transmitting RF signals. This can include generating a modem disabled signal on an output signal port on the input/output port of the GPS modem. The modem disabled signal is conveyed to the second circuit means via the second connection means period. The second circuit means conveys the modem disable signal to the import command means via the first connection means to energize a visual indicator that can be a light emitting diode ("LED"). The led remains lit while a GPS modem is disabled. When the GPS modem is moved a predetermined distance from the location it was disabled, the GPS modem is re-enabled to transmit RF signals upon becoming re-enabled, either by turning the RF transmitter on or by tuning the RF transmitter to an active gateway on the satellite communications network. The modem disabled visual indicator is then turned off.

In one embodiment, the predetermined distance is programmed into the GPS modem at the time of manufacture. In another embodiment, the predetermined distance can be programmed in the GPS modem by a user having a general purpose personal computer operatively connected to the GPS modem, the computer having a software program configured to edit the operational parameters of the GPS modem. The computer can be connected to the GPS modem with an interface cable or it can be connected via a wireless communications network. Embodiments of this can include wireless local area networks (i.e., "Bluetooth®", Wi-Fi, etc.), GSM networks and satellite communications networks. The predetermined distance is set such that the GPS modem is re-enabled at a safe distance from the location where the perforation operations are being conducted. This distance can be in the order of 300 meters to 500 meters or more as determined by a person skilled in the art as to the appropriate safe distance required to move away from a well site where perforation operations are being conducted.

In another embodiment, the apparatus is a stand-alone device that works with commercially available GPS modems. Another embodiment, the apparatus is part of kit including computer readable medium containing software configured to work on a general purpose personal computer operatively connected to a GPS modem. The software enables a user to edit and set operational parameters of the GPS modem, including other things, the predetermined distance the GPS modem must travel in order to re-enable RF signal transmissions after being disabled.

In another embodiment, the apparatus is disposed within a GPS modem whereby the input command means is disposed on the GPS modem itself. The first and second connections means and the first and second circuit means are all disclosed within the GPS modem.

Broadly stated, one aspect of an apparatus for disabling RF signal transmissions from a GPS modem comprises: input command means for generating a transmit disable signal for a GPS modem; first connection means for operatively connecting said input command means to a first circuit means; first circuit means for conveying said transmit disable signal to said GPS modem; and second connection means for operatively connecting said first circuit means to said GPS modem whereby a user operating said input command means generates said transmit disable signal that is conveyed to said GPS modem through said first connection means, said first circuit means and said second connection means, said GPS modem configured to disable RF signal transmissions therefrom upon receiving said transmit disable signal.

Broadly stated, a method for disabling RF signal transmissions from a GPS modem is provided, the GPS modem comprising at least one external signal input port and at least one output signal port, said modem configured to disable RF signal transmission therefrom upon receiving a modem disable signal on an external signal input port, said modem further configured for storing user-defined parameters for the operation of said modem, the method comprising the steps of: generating a transmit disable signal; conveying said transmit disable signal to an external signal input port disposed on said modem; and disabling RF signal transmissions from said GPS modem upon said GPS modem receiving said transmit disable signal on said external signal input port.

Broadly stated, a GPS modem having a RF signal transmitter, a microprocessor, and a memory for storing user-defined parameters used in the operation of said GPS modem is provided, said GPS modem comprising: input command means for generating a transmit disable signal; first connection means for operatively connecting said input command means to a first circuit means; first circuit means operatively connected to said microprocessor for conveying said transmit disable signal from said input command means to said microprocessor; and a memory operatively connected to said microprocessor, said memory comprising instructions executable by said microprocessor configured to cause said GPS modem to disable said RF transmissions from said GPS modem when said microprocessor receives said transmit disable signal.

Broadly stated, a kit for disabling RF signal transmissions from a GPS modem is provided, the GPS modem having a microprocessor, a memory for storing instructions executable by said microprocessor, at least one external signal input port and at least one output signal port, said modem further configured for storing at least one user-defined parameter for the operation of said GPS modem, said kit comprising: input command means for generating a transmit disable signal for a GPS modem; first connection means for operatively connecting said input command means to a first circuit means; first circuit means for conveying said transmit disable signal to said GPS modem; second connection means for operatively connecting said first circuit means to an external signal input port disposed on said GPS modem whereby a user operating said input command means generates said transmit disable signal that is conveyed to said external signal input port through said first connection means, said first circuit means and said second connection means, said GPS modem configured to disable RF signal transmissions therefrom upon receiving said transmit disable signal; and computer readable medium with computer executable instructions stored thereon for use with a general purpose computer operatively connected to said GPS modem, said executable instructions configured for enabling said general purpose computer to program said GPS modem to disable RF signal transmissions from said GPS modem when said transmit disable signal is received on said external signal input port.

Broadly stated, a method for disabling RF signal transmissions from a GPS modem is provided, the GPS modem operatively mounted in a motor vehicle, said GPS modem comprising an RF transmitter, a microprocessor, a memory, at least one external signal input port and at least one output signal port, said GPS modem further configured for storing user-defined parameters for the operation of said GPS modem, said method being embodied on a computer-readable medium such that, when implemented on a general purpose computer operatively connected to said GPS modem, said general purpose computer is capable of programming said GPS modem to carry out the method of disabling RF signal transmissions therefrom upon receiving a modem disable signal on said at least one external signal input port, the computer-readable medium characterized by: a code segment for determining if the ignition of said vehicle is turned off; a code segment for determining if the ignition of said vehicle is turned on and if said vehicle is stationary; a code segment for determining if the ignition of said vehicle is turned on and if said vehicle is moving; and a code segment for disabling RF signal transmissions from said GPS modem if a modem disable signal is received on said at least one external signal input port.

DETAIL DESCRIPTION OF EMBODIMENTS

An apparatus and method for manually disabling RF signal transmissions from a GPS modem is provided.

Figure 1:
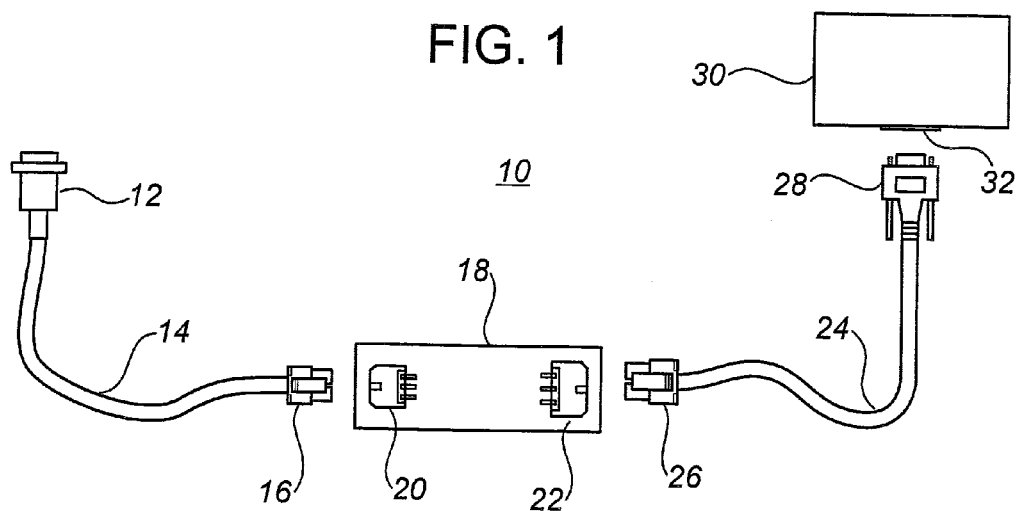
FIG. 1 is a block diagram depicting one embodiment of a GPS modem disabling apparatus.

Referring to FIG. 1, an embodiment of the apparatus is shown. Apparatus 10 comprises push button 12 attached to cable 14 having connector 16. Connector 16 releasably connects with connector 20 disposed on circuit board 18. Apparatus 10 further comprises cable 24 that operatively connects circuit board 18 to GPS modem 30. Connector 26 on cable 24 releasably connects with connector 22 disposed on circuit board 18. Connector 28 on cable 24 releasably connects to input/output ("I/O") port 32 disposed on modem 30. A representative embodiment of modem 30 is the model ST2500 GPS modem manufactured by Stellar of Herdon, Virgina, U.S.A. although it should obvious to a person skilled in the art that any functionally equivalent modem can be used.

Figure 2:
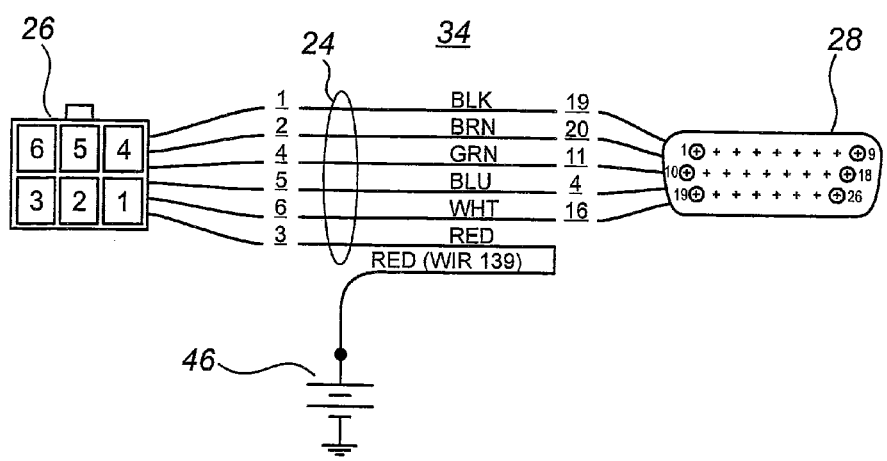
FIG. 2 is a wiring schematic depicting the cable of the apparatus of FIG. 1 connected to the GPS modem.

Referring to FIG. 2, an embodiment of cable 24 is shown. In one embodiment, cable 24 comprises a plurality of conductors. In the illustrated embodiment, cable 24 can comprise 6 conductors, one conductor for each conductor position in cable connector 26 attached to one end of cable 24. The other end of cable 24 comprises cable connector 28. In the illustrated embodiment, wiring legend 34 shows the wire connections between cable connector 26 and cable connector 28. The connections to various positions of connector 24 and pins of connector 28 will be discussed in further detail below.

Figure 3:
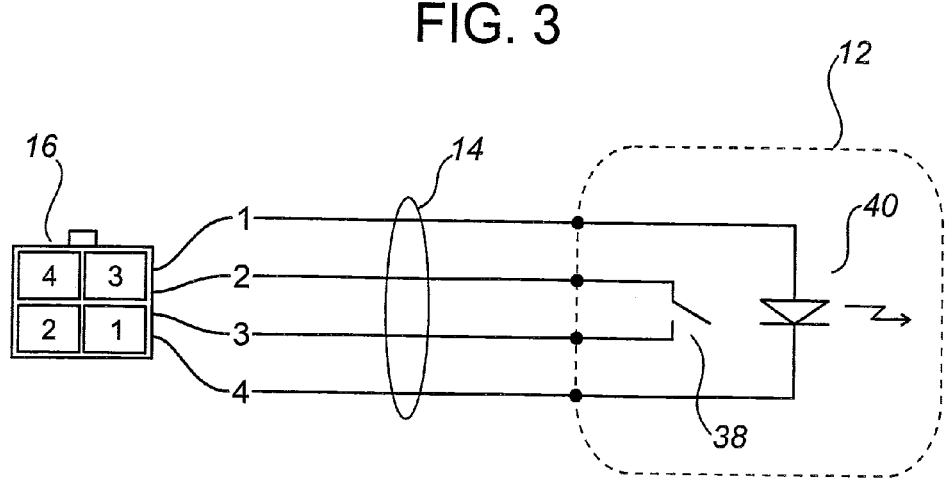
FIG. 3 is a wiring schematic depicting a cable of the apparatus of FIG. 1 located between the push button and the circuit board.

Referring to FIG. 3, an embodiment of cable 14 is shown. Cable 14 can comprise a plurality of conductors. In the illustrated embodiment, cable 14 comprises at least four conductors, one conductor for each conductor position in cable connector 16 attached to one end of cable 14. The other end of cable 14 is operative connected to push button switch 12. Disposed within push button switch 12 are switch contacts 38 and LED 40. A representative example of push button switch 12 is model KB 15 miniature push button switch from NKK switches of Scottsdale, Ariz., U.S.A. although it should be obvious to a person skilled in the art that any functionally equivalent switch can be used.

Figure 4:
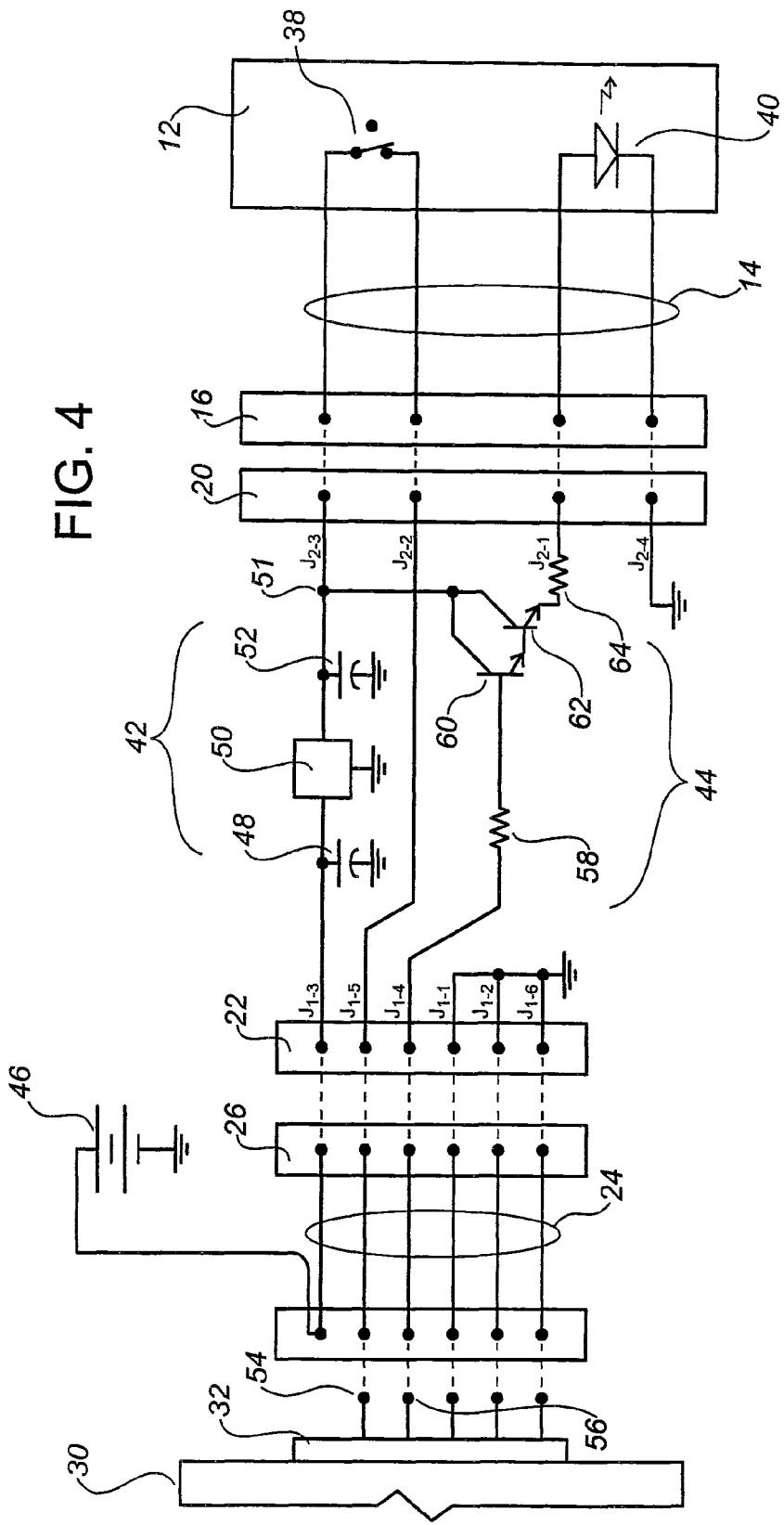
FIG. 4 is a schematic depicting the circuit board from the apparatus of FIG. 1.

Referring to FIG. 4, an electronic schematic of circuit board 18 is shown. In one embodiment, circuit board 18 comprises first circuit means 42 and second circuit means 44 although it should be obvious to a person skilled in the art that first circuit means 42 and second circuit means 44 can be located on separate circuit boards.

First circuit means 42, as shown in the representative embodiment in FIG. 4, can include capacitor 48, voltage regulator 50 and capacitor 52. First circuit means 42 operatively connects positions J1-3 and J1-5 on connector 22 with position J2-3 and J2-2, respectively, on connector 20. Battery 46 provides direct current ("DC") voltage to supply circuit board 18. As modem 30 is typically located in a motor vehicle, therefore, battery 46 can be a nominal 12 volts DC or 24 volts DC depending on the vehicle modem 30 is mounted in. Capacitor 48 filters the battery current from battery 46 prior to flowing through regulator 50. Regulator 50 regulates the battery voltage from battery 46 to a fixed voltage level. In the illustrated embodiment, regulator 50 is a "7805-type" 5-volt DC regulator as well known to those skilled in the art although any functionally equivalent regulator can be used. The selection and use of a 5-volt regulator is purely a choice of convenience and not one of necessity. It should be obvious to those skilled in the art that regulator 50 can be chosen or configured to produce any suitable fixed voltage level that can provide the necessary voltage to perform the functions described herein. Capacitor 52 further filters the output voltage 51 from regulator 50. Output voltage 51 is connected to switch contact 38 of push button 12 by connectors 20 and 16 and cable 14. In the illustrated embodiment, push button 12 is a momentary push button switch and contacts 38 are normally closed. In this embodiment, output voltage 51 is connected through contacts 38 to digital input port 54 on I/O port 32 of modem 30. In this configuration, +5 VDC is connected to input port 54 under normal operational conditions. When a user operates push button 12, contacts 38 are opened thereby removing output voltage 51 from input port 54. When the user releases push button 12, contacts 38 close thereby reconnecting output voltage 51 to input port 54. In one embodiment, the change voltage on input port 54 provides a signal to modem 30 to increment a digital counter disposed within the hardware and/or software of modem 30. In this configuration, modem 30 is programmed to interpret a change in the digital counter as a request to disable RF signal transmissions from modem 30. It should be obvious to a person skilled in the art that push button 12 and contacts 38 can be configured with first circuit means 42 such that contacts 38 can normally be open and close a circuit when push button 12 is depressed. In another embodiment, contacts 38 can be configured to cause a transition from a low voltage to a high voltage or vice versa when push button 12 is depressed. In yet another embodiment, contacts 38 can be configured to cause a transition from a logic "zero" to a logic "one" or vice versa.

In one embodiment, second circuit means 44 comprise resistor 58, transistors 60 and 62 and resistor 64. Transistor 60 and 62 can be configured as a Darlington pair to operate as an electrical switch in the illustrated embodiment although it should be obvious to a person skilled in the art that any suitable semiconductor device can be used as an electrical switch. Representative examples of suitable semiconductor devices can include field effect transistors, bipolar junction transistors, triacs, opto-couplers and light dependent resistors to name but a few as known to those skilled in the art. The collectors of transistor 60 and 62 are connected to output voltage 51. The emitters of transistors 62 are connected to the anode of LED 40 via resistor 64, connectors 20 and 16 and cable 14. One end of resistor 58 is connected to the base of transistor 60 while the other end of resistor 58 is operatively connected to digital output port 56 on I/O port 32 of modem 30 via connectors 22 and 26, cable 24 and connector 28. Digital output port 56 is normally set at a low voltage or ground potential. When a user depresses push button 12 to disable RF signal transmissions from modem 30, modem 30 is programmed to cause digital output port 56 to change from ground to a high voltage such as +5 VDC or any other suitable voltage. Upon output port 56 being raised to a high voltage, current will flow through resistor 58 to the base of transistor 60 thereby turning transistor 60 on. This, in turn, causes transistor 62 to turn on and allow current to flow through resistor 64 to LED 40 thereby turning LED 40 on and thereby providing a visual indication that RF signal transmission have been disabled on modem 30. It should also be obvious to persons skilled in the art that in place of transistors 60 and 62 to turn LED 40 on and off, electromechanical devices such as a relay can be used.

In one embodiment, a kit for use with a GPS modem that can disable RF transmission from the modem include the apparatus as described above and computer readable medium containing software that is used to configure modem 30 to carry out a method for disabling RF signal transmissions.

Figure 5:
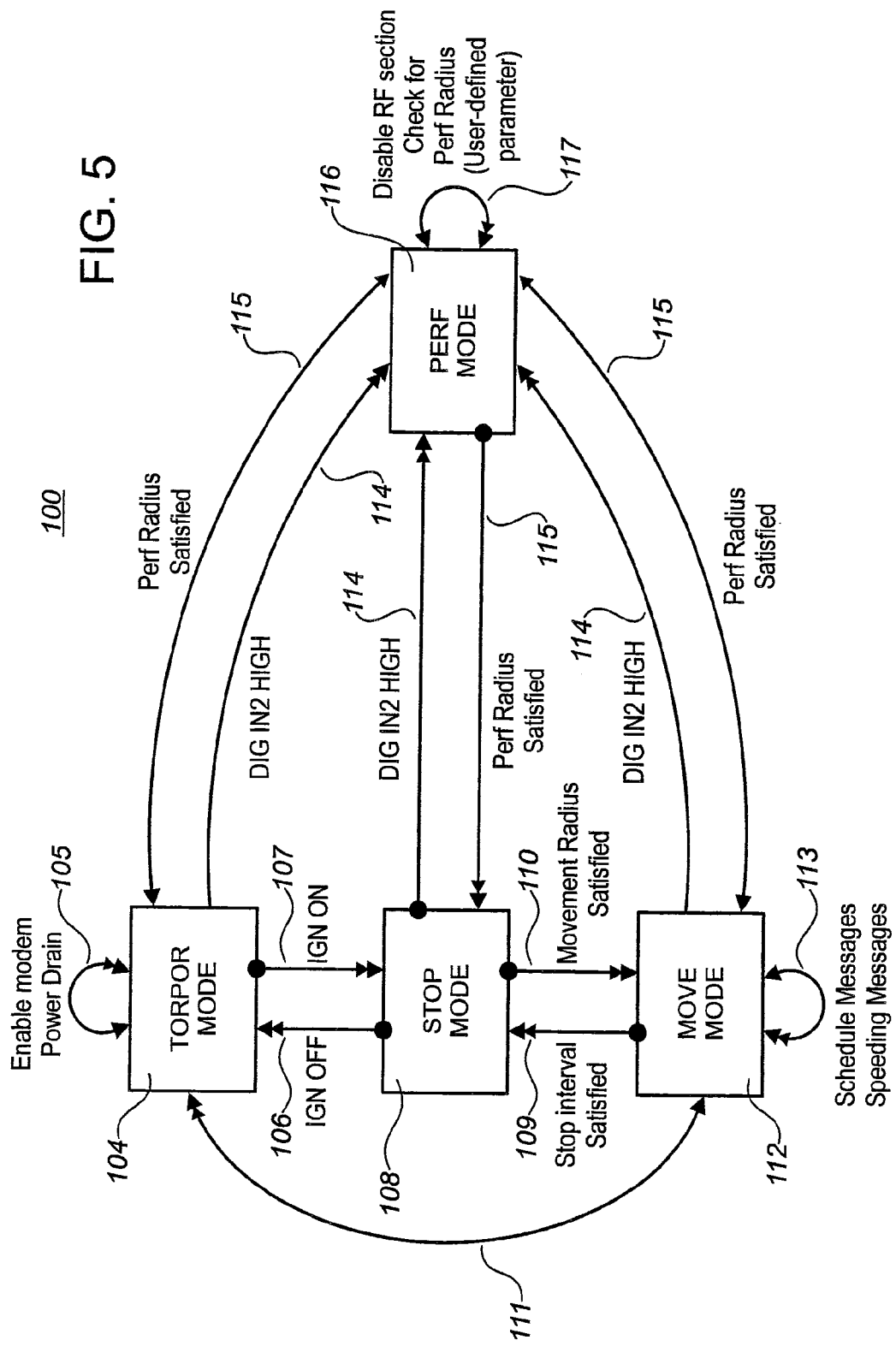
FIG. 5 is a logic state diagram depicting one embodiment of a method to disable a GPS modem.

Referring to FIG. 5, a logic state diagram of representative software for use with a GPS modem is shown indicating modes of operation of a GPS modem configured to operate with an apparatus used to disable RF signal transmissions from the modem. As shown in FIG. 5, logic state diagram 100 can comprise four modes: "TORPOR MODE 104", "STOP MODE 108", "MOVE MODE 112" and "PERF MODE 116". GPS modem 30 is in Torpor Mode 104 when the ignition of the vehicle, that modem 30 is mounted in, is turned off. When modem 30 is in Torpor Mode 104, modem 30 is in sleep mode, hence, the functions of modem 30 are limited to conserve battery power. Modem 30 will still check for incoming user commands. It will also check for external power voltage input to determine when the vehicle's ignition is turned on.

In Stop Mode 108, the ignition of the vehicle is turned on but the vehicle is not moving. In this mode, modem 30 will check the status of the engine being started on the vehicle. It will also check for incoming user commands.

In Move Mode 112, the vehicle that modem 30 has its ignition turned on and is moving. In this mode, modem 30 monitors the speed of the vehicle as well as monitoring input user commands.

In Perf Mode 116, modem 30 has received an input command to disable RF signal transmissions from modem 30. In this mode, modem 30 will still generate and accumulate messages regarding the operational parameters concerning the vehicle and hold them in a queue. It will disable the RF transmitter section of the modem or re-tune the RF transmitter portion of modem 30 to a non-existent or null satellite communications network gateway that effectively disables all RF signal transmissions from modem 30. Modem 30 will continue to receive GPS signals from the GPS satellite communication system and upon the vehicle being moved a user-defined safe distance from the location where RF signal transmissions were disabled, modem 30 is then re-enabled automatically to send RF signal transmissions. Messages stored in the queue will then be transmitted.

From each of Torpor Mode 104, Stop Mode 108 and Move Mode 112, modem 30 can be shifted to Perf Mode 116 upon a user depressing push button 12 of apparatus 10. In Torpor Mode 104, modem 30 can be powered down at step 105 or it can move to Stop Mode 108 when the ignition of the vehicle is turned on at step 107. In Stop Mode 108, modem 30 can revert back to Torpor Mode 104 if the ignition is turned off at step 106. Conversely, modem 30 can change from Stop Mode 108 to Move Mode 112 when the vehicle begins moving beyond a predetermined threshold shown at step 110. In Move Mode 112, modem 30 can revert back to Stop Mode 108 if movement of the vehicle decreases below a predetermined threshold as shown in step 109. In addition, while the vehicle is moving in Move Mode 112, messages concerning the vehicle are scheduled for transmission by modem 30 at step 113. Modem 30 can revert from Move Mode 112 to Torpor Mode 104 if ignition of the vehicle is turned off at step 111. In each of Torpor Mode 104, Stop Mode 108 and Move Mode 112, modem 30 can shift to Perf Mode 116 when push button 12 is depressed as shown at step 114. In Perf Mode 116, modem 30 monitors its position on the GPS communication system as shown in step 117. In Perf Mode 116, as noted above, RF signal transmissions from modem 30 are disabled. When the vehicle moves beyond a user-defined predetermined distance as programmed in modem 30, modem 30 will revert from Perf Mode 16 back to its former mode as shown at step 115. This means the vehicle has moved a safe distance away from where perforation operations are taking place and that RF signal transmissions from modem 30 are automatically re-enabled.

Figure 6:
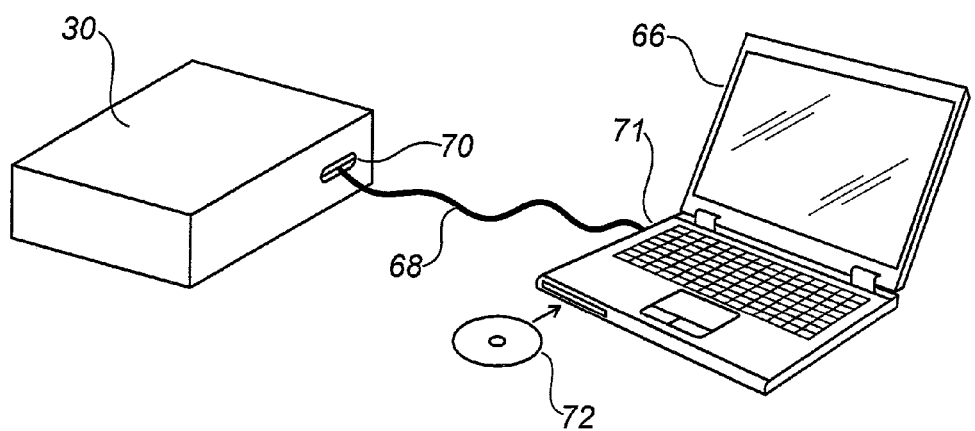
FIG. 6 is a block diagram depicting a GPS modem connected to a general purpose computer.

As noted above, one embodiment of the method and apparatus to disable RF signal transmissions from a GPS modem includes a kit to allow a user to configure a GPS modem to work with an apparatus to disable RF signal transmissions. This requires programming modem 30 with software to operate the logic states described above and as shown in FIG. 5. FIG. 6 illustrates how this is accomplished. A personal computer 66 is used with modem 30 to program modem 30. Interface cable connects modem 30 at interface port 70 to interface port 71 on computer 66. As is well known to those skilled in the art, interface ports 70 and 71 may be a serial data port or a universal serial bus connection or any other suitable method of data communication between computer 66 and modem 30. Computer medium disk 72 is inserted in personal computer 66 and is configured to allow a user to program modem 30 with the necessary software to allow modem 30 to carry out the logic flow diagram as set out in FIG. 5. It also allows a user to program the predetermined safe distance that a vehicle must travel away from a location where RF signal transmissions were disabled from modem 30.

Figure 7:
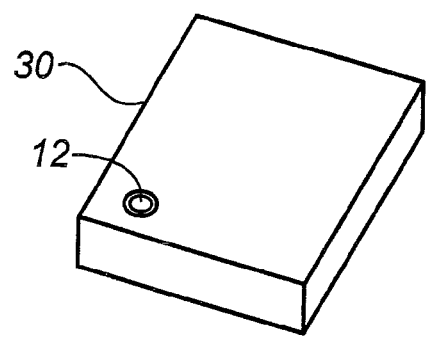
FIG. 7 is a perspective view depicting a GPS modem comprising an apparatus for manually disabling RF signal transmissions therefrom.

In another embodiment, apparatus 10 may be disposed within modem 30. FIG. 7 illustrates the simple block diagram of modem 30 comprising push button 12 mounted on modem 30. In this embodiment, functional equivalents of circuit board 18 and first and second connection means 14 and 24 are all disposed within modem 30.

Figure 8:
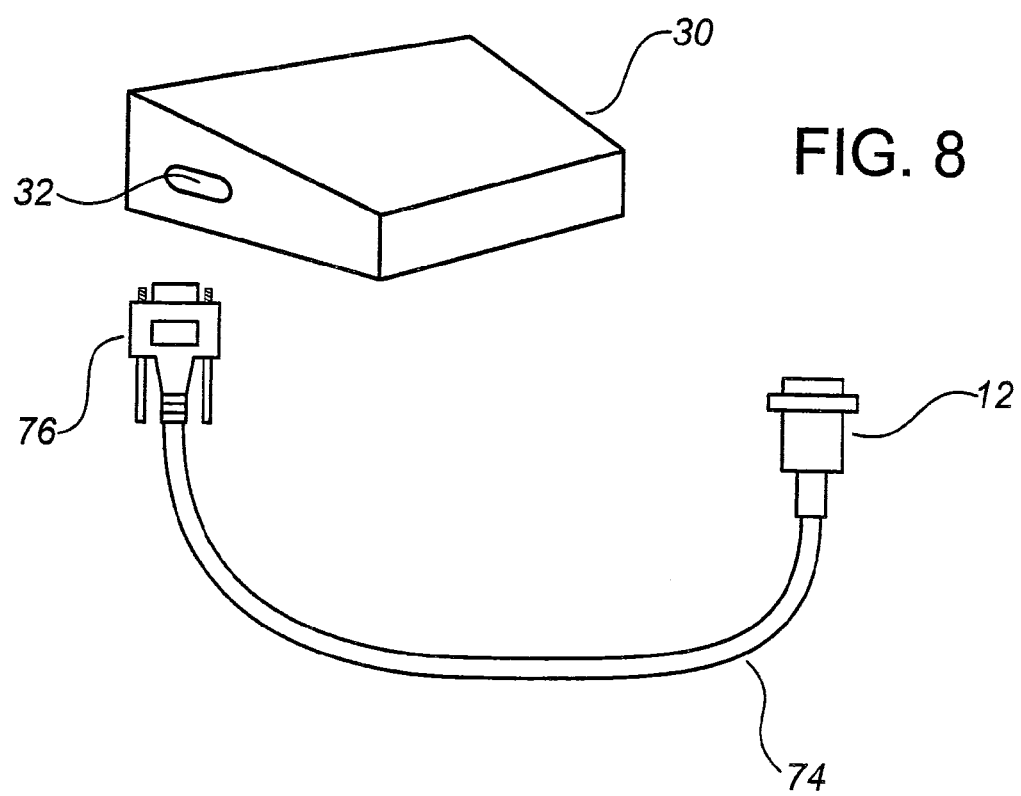
FIG. 8 is a perspective view depicting a GPS modem comprising a cable and push button for manually disabling RF signal transmissions therefrom.

FIG. 8 illustrates yet a further embodiment. In this embodiment, modem 30 can comprise circuitry internally that is functionally equivalent to the combination of some or all of circuit board 18, first and second connection means 14 and 24, first circuit means 42 and second circuit means 44. In this embodiment, connector 76 on one end of cable 74 connects to I/O port 32 on modem 30. Push button 12 is disposed on the other end of cable 74. When connector 76 is coupled to I/O port 32, a circuit connection is made between at least two connection pins on I/O port 32 (for example, digital input port 54 and battery or ground as shown in FIG. 4) and switch contacts disposed in push button 12 (for example, contacts 38 as shown in FIG. 4), through cable 74. The switch contacts can either open a closed circuit, or close an open circuit to generate a modem disable signal. In other embodiments, the switch contacts can cause a transition from a low voltage to a high voltage or vice versa when push button 12 is depressed. In yet another embodiment, contacts 38 can be configured to cause a transition from a logic "zero" to a logic "one" or vice versa.

In other embodiments, another circuit connection is made between at least two connection pins on I/O port 32 (for example, digital output port 56 and ground as shown in FIG. 4) and an LED (for example, LED 40 as shown in FIG. 4) disposed in push button 12, through cable 74. In operation, push button 12 is depressed to convey a modem disable signal to I/O port 32 through cable 74 and connector 76 to disable RF signal transmissions from modem 30. Upon doing so, a modem disabled signal is then conveyed from modem 30 to push button 12. In other words, sufficient voltage is applied to digital output port 56 that, in turn, supplies sufficient current to turn LED 40 on so as to provide a visual indication that modem 30 is disabled.

Although a few embodiments have been shown and described, it will be appreciated by those skilled in the art that various changes and modifications might be made without departing from the scope of the apparatus and method described herein. The terms and expressions used in the preceding specification have been used herein as terms of description and not of limitation, and there is no intention in the use of such terms and expressions of excluding equivalents of the features shown and described or portions thereof, it being recognized that the scope of the invention is defined and limited only by the claims that follow.

I claim:

1. An apparatus for disabling radio frequency ("RF") signal transmissions from a global positioning system ("GPS") modem, comprising:
   a) input command means for generating a transmit disable signal for a GPS modem;
   b) first connection means for operatively connecting said input command means to a first circuit means;
   c) first circuit means for conveying said transmit disable signal to said GPS modem; and
   d) second connection means for operatively connecting said first circuit means to said GPS modem whereby a user operating said input command means generates said transmit disable signal that is conveyed to said GPS modem through said first connection means, said first circuit means and said second connection means, said GPS modem configured to disable RF signal transmissions therefrom upon receiving said transmit disable signal.

2. The apparatus as set forth in claim 1 further comprising second circuit means operatively connected to said GPS modem for conveying a modem disabled signal generated by said GPS modem from an output signal port disposed on said GPS modem to a modem disabled indicator means.

3. The apparatus as set forth claim 2 wherein said second circuit means is disposed on a circuit board comprising said first circuit means, said second circuit means operatively connected to said GPS modem through said second connection means.

4. The apparatus as set forth claim 1 wherein said second connection means is configured to convey said transmit disable signal to an external signal input port disposed on said GPS modem.

5. The apparatus as set forth in claim 2 wherein said modem disabled indicator means is operatively connected to said second circuit means for indicating when said GPS modem is disabled from transmitting RF signals.

6. The apparatus as set forth in claim 5 wherein said modem disabled indicator means is disposed in said input command means and is operatively connected to said second circuit means through said first connection means.

7. The apparatus as set forth in claim 6 wherein said first and second connection means each comprise a multi-conductor cable.

8. The apparatus as set forth in claim 6 wherein said input command means comprises a single-throw, single-pole electrical switch having two terminals.

9. The apparatus as set forth in claim 8 wherein said transmit disable signal comprises at least one of the group consisting of a circuit opening, a circuit closing, a transition from a logic '0' to a logic '1', a transition from a logic '1' to a logic '0', a transition from a low voltage to a high voltage and a transition from a high voltage to a low voltage.

10. The apparatus as set forth in claim 9 wherein said first circuit means comprises voltage regulation means to convert a power supply voltage to a signal voltage suitable for conveying to said external signal input port, said first circuit means configured to supply said signal voltage to one terminal of said electrical switch of said input command means, said first circuit means further configured to provide a conducting path from the other terminal of said electrical switch to said external signal input port whereby transmit disable signal is generated when said electrical switch is closed thereby providing said signal on said external signal input port.

11. The apparatus as set forth in claim 9 wherein said modem disabled indicator means comprises a visual indicator device.

12. The apparatus as set forth in claim 11 wherein said visual indicator device is a light emitting diode.

13. A method for disabling radio frequency ("RF") signal transmissions from a global positioning system ("GPS") modem comprising at least one external signal input port and at least one output signal port, said modem configured to disable RF signal transmission therefrom upon receiving a modem disable signal on an external signal input port, said modem further configured for storing user-defined parameters for the operation of said modem, the method comprising the steps of:
   a) generating a transmit disable signal;
   b) conveying said transmit disable signal to an external signal input port disposed on said modem; and
   c) disabling RF signal transmissions from said GPS modem upon said GPS modem receiving said transmit disable signal on said external signal input port.

14. The method as set forth in claim 13 further comprising the step of providing a visual indication that said GPS modem has been disabled from transmitting RF signals.

15. The method as set forth in claim 13 further comprising the step of re-enabling RF signal transmissions from said GPS modem once said GPS modem has moved at least a predetermined distance from the location where said GPS modem was disabled from transmitting RF signals.

16. The method as set forth in claim 15 wherein said predetermined distance is a user-defined parameter stored on said GPS modem.

17. The method as set forth in 13 wherein said step of disabling RF signal transmissions from said GPS modem comprises the step of disabling an RF transmitter disposed on said GPS modem.

18. The method as set forth in 13 wherein said step of disabling RF signal transmissions from said GPS modem comprises the step of tuning said GPS modem to a non-existent or null satellite telecommunications gateway.

19. A global positioning system ("GPS") modem having a radio frequency ("RF") signal transmitter, a microprocessor, and a memory for storing user-defined parameters used in the operation of said GPS modem, said GPS modem comprising:
   a) input command means for generating a transmit disable signal;
   b) first connection means for operatively connecting said input command means to a first circuit means;
   c) first circuit means operatively connected to said microprocessor for conveying said transmit disable signal from said input command means to said microprocessor; and
   d) a memory operatively connected to said microprocessor, said memory comprising instructions executable by said microprocessor configured to cause said GPS modem to disable said RF transmissions from said GPS modem when said microprocessor receives said transmit disable signal.

20. The GPS modem as set forth in claim 19 further comprising second circuit means operatively connected to said microprocessor for generating a modem disabled signal.

21. The GPS modem as set forth in claim 20 further comprising modem disabled indicator means operatively connected to said second circuit means for indicating when said GPS modem is disabled from transmitting RF signals.

22. The GPS modem as set forth in claim 21 wherein said transmit disable signal comprises at least one of the group consisting of a circuit opening, a circuit closing, a transition from a logic '0' to a logic '1', a transition from a logic '1' to a logic '0', a transition from a low voltage to a high voltage and a transition from a high voltage to a low voltage.

23. The GPS modem as set forth in claim 20 wherein said modem disabled indicator means comprises a visual indicator device.

24. The GPS modem as set forth in claim 23 wherein said visual indicator device is a light emitting diode.

25. The GPS modem as set forth in claim 19 wherein said input command means comprises an electrical switch.

26. A kit for disabling radio frequency ("RF") signal transmissions from a global positioning system ("GPS") modem having a microprocessor, a memory for storing instructions executable by said microprocessor, at least one external signal input port and at least one output signal port, said modem further configured for storing at least one user-defined parameter for the operation of said GPS modem, said kit comprising:
   a) input command means for generating a transmit disable signal for a GPS modem;
   b) first connection means for operatively connecting said input command means to a first circuit means;
   c) first circuit means for conveying said transmit disable signal to said GPS modem;
   d) second connection means for operatively connecting said first circuit means to an external signal input port disposed on said GPS modem whereby a user operating said input command means generates said transmit disable signal that is conveyed to said external signal input port through said first connection means, said first circuit means and said second connection means, said GPS modem configured to disable RF signal transmissions therefrom upon receiving said transmit disable signal; and
   e) computer readable medium with computer executable instructions stored thereon for use with a general purpose computer operatively connected to said GPS modem, said executable instructions configured for enabling said general purpose computer to program said GPS modem to disable RF signal transmissions from said GPS modem when said transmit disable signal is received on said external signal input port.

* * * * *

UNITED STATES PATENT AND TRADEMARK OFFICE
CERTIFICATE OF CORRECTION

PATENT NO. : 8,311,581 B2
APPLICATION NO. : 12/820163
DATED : November 13, 2012
INVENTOR(S) : Amr Khaled Nasr It is certified that error appears in the above-identified patent and that said Letters Patent is hereby corrected as shown below:

Column 10, Line 64, Claim 17, delete "13" and insert -- claim 13 --

Column 11, Line 1, Claim 18, delete "13" and insert -- claim 13 --

Signed and Sealed this
Fifth Day of February, 2013

Teresa Stanek Rea
*Acting Director of the United States Patent and Trademark Office*